United States Patent [19]
Galione

[11] 4,163,538
[45] Aug. 7, 1979

[54] TORSION COUNTERACTING PIVOTS

[75] Inventor: Edward R. D. Galione, Bury St. Edmunds, England

[73] Assignee: W. Vinten Limited, Bury St. Edmunds, England

[21] Appl. No.: 911,170

[22] Filed: May 31, 1978

[51] Int. Cl.² .............................................. A47F 5/00
[52] U.S. Cl. .................................... 248/278; 248/124
[58] Field of Search ............... 248/280, 278, 289, 280, 248/281, 288 B, 123, 124, 2, 324; 182/2; 173/43; 52/114, 117

[56] References Cited

U.S. PATENT DOCUMENTS

| 1,176,272 | 3/1916 | Bultman | 248/281 |
| 2,975,993 | 3/1961 | Beagan | 248/2 |
| 3,160,379 | 12/1964 | Gardella | 248/280 X |
| 3,590,930 | 7/1971 | Gronfors | 173/43 X |
| 3,724,559 | 4/1973 | Stromnes | 173/43 X |

Primary Examiner—J. Franklin Foss
Attorney, Agent, or Firm—Larson, Taylor and Hinds

[57] ABSTRACT

The invention comprises a hinged joint mainly for use on beam mounted rotatable platforms for counteraction of torsional twist in the beam so that the c. of g. of an article mounted on the platform traverses a horizontal path when the platform is rotated about its pivot point on the beam.

7 Claims, 6 Drawing Figures

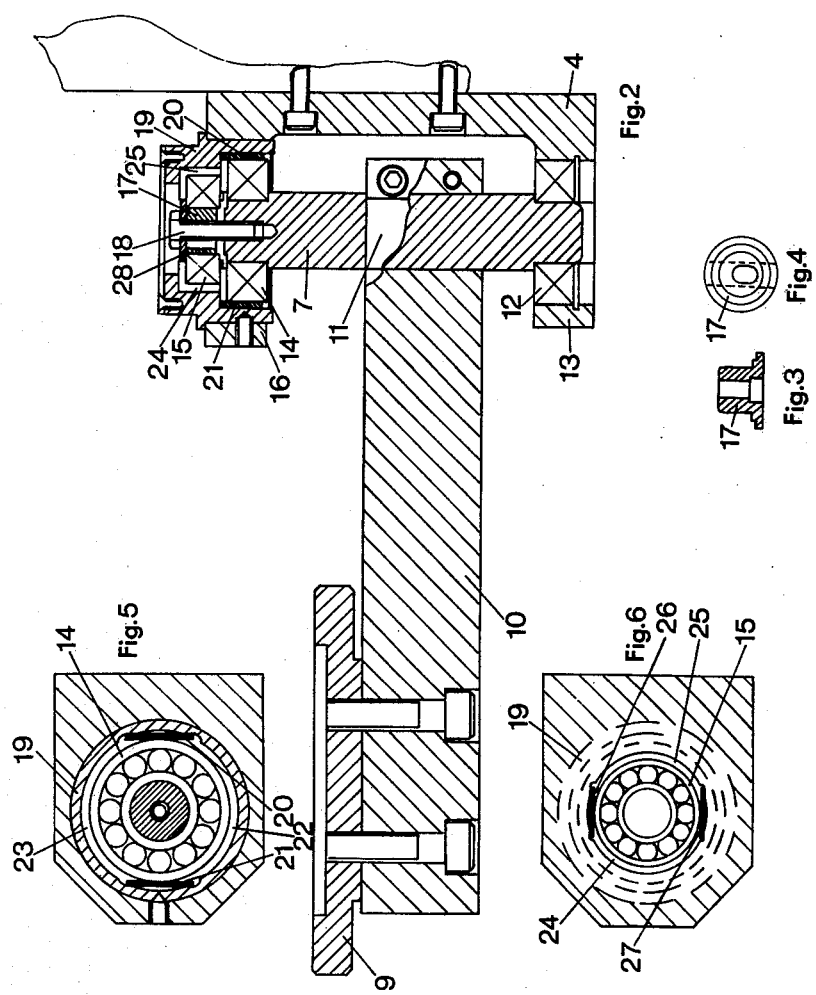

TORSION COUNTERACTING PIVOTS

This invention relates to apparatus for counteraction of torsional movement of an article when pivotally mounted on a beam and when the centre of gravity of the article may be rotated off the longitudinal axis of the beam and more particularly, though not exclusively, to apparatus for maintaining a platform level when said platform is pivotally mounted on a beam and is mounted in such a manner that the centre of gravity of the platform is movable off the longitudinal axis of the beam.

Often, but more specifically in the field of television, it is necessary to operate equipment which is mounted on a platform, located on, or at the end of, a beam. It is preferable that the platform is maintained level as the centre of gravity of the platform rotates off the longitudinal axis of the beam. However, as the centre of gravity of the platform moves away from the longitudinal axis of the beam a torque is applied to the beam and the torsion causes the platform to tilt. Where this tilt of the platform is to be avoided extra strength has usually been applied to the beam with a consequent increase of weight and/or bulk. There are however, situations in which weight and/or bulk must be kept at a minimum. Such a situation is the field of television camera mountings wherein the equipment may have to be manhandled to a site for outside broadcasts or be manoeuvred around a studio with a minimum of effort, but maximum stability. Though there are other situations having similar problems it is in conjunction with that of television that the application will be described.

In the field of television camera mountings the mounting is sometimes located on a platform, or the camera may be directly mounted on the platform, and the platform may be pivotally located on the beam for vertically pivotal movement about the longitudinal axis of the beam. The beam may also be pivotally mounted for rotation about vertical and horizontal pivots. Preferably the beam would be balanced about the horizontal axis for ease of control in elevation and a pantographic type linkage would be utilised to maintain the platform level as the elevation of the platform changed by pivotal action of the beam about the horizontal axis. These types of apparatus are known and it is the mounting of the platform to the beam of this apparatus to which this invention is mainly directed.

The specific example taken is that wherein the platform is pivotally located on the end of the beam so that the centre of gravity of an article, mounted on the platform, traverses an arcuate path about the platform pivot point. As the centre of gravity traverses its arcuate path it is preferable that the path will be horizontal but due to the torsional twist of the beam the centre of gravity of the article is only on the horizontal path when in line with the longitudinal axis of the beam and dips proportionally below the horizontal path as it traverses to the right or left, being at a maximum low at 90° to the longitudinal axis of the beam. To overcome this problem it is necessary to maintain the platforms pivotal axis vertical.

It is therefore an object of this invention to provide a means whereby the arcuate path traversed by the centre of gravity of the article mounted on the platform, or the centre of gravity of the platform, is horizontal and the dip due to torsional twist of the beam is eliminated.

According to the invention we provide a hinged joint comprising a double ended bracket having a spindle pivotally mounted between said ends wherein a first end of said spindle is mounted for rotation about its axial centre, and a second end of said spindle is mounted for rotation about its axial centre and said axial centre of said second end in use is traverseable along a diametric line of the spindle.

According to a further aspect of the invention we provide a hinged joint comprising a double ended bracket having a spindle pivotally mounted between said ends wherein a first end of said spindle is mounted for rotation about its axial centre, a second end of said spindle is mounted for rotation about its axial centre and said axial centre of said second end is use is traverseable along a diametric line of the spindle, and an adjustable means is incorporated in said second end of said spindle for control of distance traversed along said diametric line of the spindle when said spindle is rotated.

According to a still further aspect of the invention we provide a hinged joint comprising a double ended bracket having a spindle pivotally mounted between said ends, a first end of said spindle mounted for rotation about its axial centre, a second end of said spindle mounted for rotation about its axial centre and said axial centre of said second end in use is traverseable along a diametric line of the spindle, a beam for attachment of said bracket and a platform located on and extending away from said spindle wherein said spindle maintains verticality when rotated with said platform by the action of said diametric traversing of said second end thereby counteracting torsional twist of said beam caused by rotational movement of said platform with said spindle to maintain said platform level.

An embodiment of the invention will now be described, by way of example only, in conjunction with the drawings in which, FIG. 1 shows a pivoted beam of the type used for camera mountings and has the invention embodied.

FIG. 2 shows a cross section through the side elevation of the invention when the platform is in line with the longitudinal axis of the beam.

FIGS. 3 and 4 show a cross section and a plan view respectively of an eccentric stud of the invention, FIG. 5 shows a plan view of one spindle bearing in the second end of the double ended bracket and FIG. 6 shows a plan view of the second spindle bearing in the second end of the double ended bracket.

Figure 1:
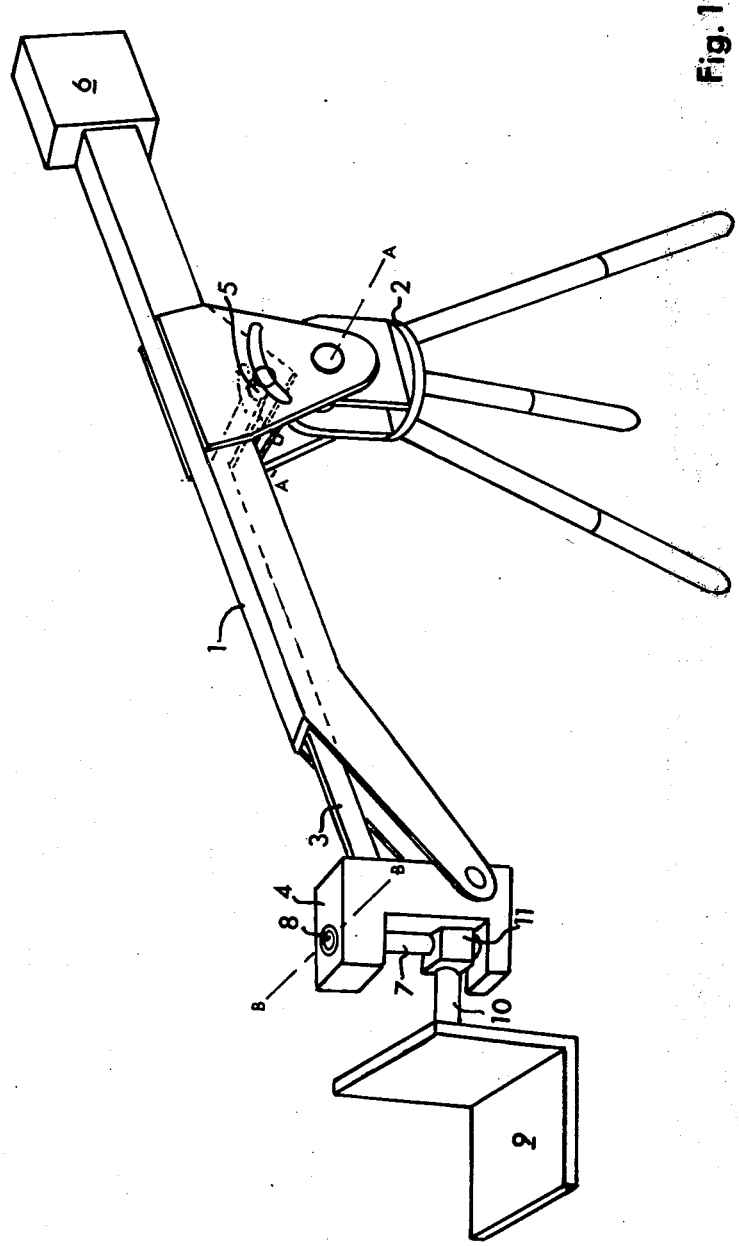

Referring to FIG. 1 a balanced beam (1) is mounted for pivotal movement about axis A—A and is rotatable about the vertical on a tripod (2). A pantographic linkage comprising beam (1) cranked rod (3) bracket (4) and a link, formed by pivot pin (5) joining beam (1) and cranked rod (3), maintains bracket (4) vertical when the beam (1) is tilted about axis A—A. A counterbalance weight (6) which may also be operated from pantographic linkage, not shown, counterbalances the apparatus about axis A—A. A spindle (7) is mounted in the bracket (4) for rotational movement about the vertical pivot (8) of the spindle (7) for movement along line B—B as spindle (7) is rotated. A platform (9) attached, preferably adjustably, to the spindle (7) by an arm (10) may have a camera or the like mounted thereon. Screws, not shown, may be located in a block (11) of arm (10) so that the platform (9) may be levelled when aligned with the longitudinal axis of the beam (1) and the spindle (7) is vertical. Counterbalance weight (6) may be adjustable to account for different weight cameras, or the like, locatable on platform (9).

Referring now to FIG. 2, the spindle (7) is shown located in a bearing (12), preferably self-aligning, in one end (13) of bracket (4), and in two bearings (14) and (15), preferably self-aligning, in a second end (16) of bracket (4). Bearings (12) and (14) are preferably concentric with spindle (7). Bearing (15) is preferably located on an eccentric stud (17) eccentrically locatable on the axis of spindle (7) and fixedly adjustable by screw (18). For ease of manufacture, end (16) of bracket (4) is bored for reception of a bush (19) into which bearings (14) and (15) may be located. Bearings (14) and (15) additionally act as cam followers and cams are formed by two parallel sides (20) and (21), spaced apart by the width of bearing (14), permitting lateral movement of bearing (14) in relation to the longitudinal axis of beam (1), as shown on FIGS. 2 and 5, by spaces (22) and (23). Bearing (15), also acting as a cam follower, is permitted movement, as shown in FIG. 6 by spaces (24) and (25), longitudinally in relation to the longitudinal axis of the beam (1), but may not move laterally due to parallel cams (26) and (27), shown on FIG. 6, spaced apart the width of bearing (15). The two sets of parallel cams by conveniently be shimed to provide a good fit but will preferably be of hardened material.

If bearings (14) and (15) were both concentrically located on spindles (7) the effect of the four cams (20), (21), (26) and (27) would be to restrain movement of the bearings and permit only rotational movement of spindle (7) about its centre line. However, the eccentricity of the location of bearing (15) and eccentric stud (17) in relation to the centre line of spindle (7), moves bearing (14) along cams (20) and (21) as spindle (7) is rotated, thus arm (10) and platform (9) tilt upwards proportionally to the degree of rotation of spindle (7). The degree of upward tilt may be adjusted by movement of the eccentrically located eccentric stud (17) about screw (18) along the longitudinal axis of arm (10) when in line with the longitudinal axis of beam (1). A washer (28) provides a bearing surface for locking the eccentric stud (17) and bearing (15) to spindle (7) with screw (18).

When viewed in conjunction with beam (1) and platform (9), preferably with a camera or the like mounted on platform (9), the upward tilt of the platform (9) as the spindle (7) rotates may be adjusted to counteract for torsional twist of the beam (1) caused by the centre of gravity of the platform (9) and camera, or the like, mounted thereon, moving off the longitudinal axis of the beam (1).

Though the specific example has been described in conjunction with camera mounting equipment it will be obvious to those skilled in the art that many other applications of the invention may be made. FIG. 2 could be inverted and the hinged joint could be utilised as a door hinge so that the base of the door rises over a carpet or the like as the door is opened. It may also be utilised as an anti-torsion device for any beam mounted mechanism wherein the mechanism is pivoted at or near the longitudinal centreline of the beam and is pivoted so that the centre of gravity of the mechanism moves off the longitudinal centre line of the beam.

It will also be obvious to those skilled in the art that by rotation of the bush (17) pre-selection of the position of the line B-B may be obtained.

I claim as my invention:

1. A hinged joint comprising a double ended bracket, a spindle pivotally mounted between the ends of said bracket, means mounting a first end of said spindle for rotation about the axial center thereof, and means mounting the second end of said spindle for rotation about the axial center thereof and for moving the second end of said spindle along a diametric line of the spindle during rotation of the spindle.

2. A hinged joint as claimed in claim 1 having an adjustable means incorporated in said second end of said spindle for control of distance traversed along said diametric line of the spindle when said spindle is rotated.

3. A hinged joint as claimed in claim 1 or claim 2 having an adjustable means incorporated in said second end of said spindle for control of distance traversed along said diametric line of the spindle when said spindle is rotated and said adjustable means further incorporates means for predetermining the position of said diametric line of the spindle.

4. A hinged joint as claimed in claim 2 or claim 3 wherein said adjustable means comprises a bush to which a bearing may be mounted and said bush has a diametrically elongated hole through which a screw or the like may be fitted for securing said bush to said second end of said spindle and said bearing acts as a cam follower moveable between two parallely aligned cams.

5. In combination, a beam, a double ended bracket attached to said beam, a spindle pivotally mounted between the ends of said bracket, means mounting a first end of said spindle for rotation about the axial center thereof, means mounting the second end of said spindle for rotation about the axial center thereof and for moving the second end of said spindle along a diametric line of the spindle during rotation of the spindle, and a mounting platform attached to said spindle.

6. A combination as claimed in claim 5 wherein said double ended bracket is attached to said beam to form a pantograph with said beam.

7. The combination as claimed in claim 4 or claim 5 wherein a camera or the like is attached to said mounting platform and the torsional twist of said beam caused by rotation of said mounting platform in use is counteracted for to maintain a theoretical vertical line drawn through the centre of gravity of the camera or the like vertical as said spindle is rotated.

* * * * *